(12) United States Patent
Kim et al.

(10) Patent No.: US 7,917,121 B2
(45) Date of Patent: Mar. 29, 2011

(54) METHOD OF EXECUTING HANDOVER IN BROADBAND WIRELESS ACCESS SYSTEM

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 878 days.

(21) Appl. No.: 11/388,687

(22) Filed: Mar. 24, 2006

(65) Prior Publication Data
US 2006/0240832 A1 Oct. 26, 2006

(30) Foreign Application Priority Data
Mar. 24, 2005 (KR) .................. 10-2005-0024697
Mar. 4, 2006 (KR) .................. 10-2006-0020731

(51) Int. Cl.
G06F 17/50 (2006.01)

(52) U.S. Cl. .................. 455/343.2; 455/414.1; 455/436; 455/438; 455/439; 455/513; 370/328; 370/331; 370/469; 709/218; 709/222

(58) Field of Classification Search .................. 455/436, 455/438, 439, 513, 41, 343.2, 414.1; 370/328, 370/331, 338, 465, 459; 709/218, 222; 713/150
See application file for complete search history.

(56) References Cited

U.S. PATENT DOCUMENTS

| | | | | |
|---|---|---|---|---|
| 5,907,542 | A * | 5/1999 | Kuehnel et al. | 370/331 |
| 6,246,872 | B1 * | 6/2001 | Lee et al. | 455/414.1 |
| 6,542,490 | B1 | 4/2003 | Ahmadvand et al. | |
| 7,016,325 | B2 * | 3/2006 | Beasley et al. | 370/331 |
| 7,336,953 | B2 * | 2/2008 | Kim et al. | 455/438 |
| 7,363,038 | B2 * | 4/2008 | Kim et al. | 455/438 |
| 7,369,853 | B2 * | 5/2008 | Son et al. | 455/436 |
| 7,626,961 | B2 * | 12/2009 | Kim et al. | 370/328 |
| 2002/0167965 | A1 * | 11/2002 | Beasley et al. | 370/465 |
| 2004/0176094 | A1 * | 9/2004 | Kim et al. | 455/438 |

(Continued)

FOREIGN PATENT DOCUMENTS

JP 2007-535205 11/2007

(Continued)

OTHER PUBLICATIONS

Alan Carlton et al: "Media Independent Handover Functions and Services Specification" IEEE 802.21, XX, XX, Jan. 9, 2005, pp. 1-77, XP002426057 ! paragraphs 3.1 and 3.2 * p. 5, line 40—p. 6 , ljne 23 * Paragraphs 3.5.1 through 3.5.4 * p. 8, line 8—p. 11, line 8; figures 3,5 * Paragraph 3.6.1 * p. 14, line 1—line 21; figure 9 * Paragraphs 3.6.3.1.13 through 3.6.3.16 * p. 25, line 16—p. 27, line 20 * Paragraphs 3.7.3.3 and 3,7 3.4 * p. 65, line 50—p. 74, line 32; figures 26,27,30,31.

(Continued)

*Primary Examiner* — William D Cumming
(74) *Attorney, Agent, or Firm* — Lee, Hong, Degerman, Kang & Waimey

(57) ABSTRACT

The primitives between an upper management layer and the MAC layer within a mobile station and a base station are defined in order to specify and clarify the operations within the protocol stack layers in a broadband wireless access system to allow a mobile station to execute handover. Media Independent Handover (MIH) procedures can be achieved because the NCMS and MIH layer can communicate through use of these primitives.

6 Claims, 6 Drawing Sheets

U.S. PATENT DOCUMENTS

| | | | |
|---|---|---|---|
| 2004/0185852 A1* | 9/2004 | Son et al. | 455/438 |
| 2004/0185853 A1* | 9/2004 | Kim et al. | 455/438 |
| 2005/0043050 A1 | 2/2005 | Lee et al. | |
| 2005/0094600 A1 | 5/2005 | Zhang et al. | |
| 2005/0096051 A1* | 5/2005 | Lee et al. | 455/438 |
| 2005/0195822 A1 | 9/2005 | Lim et al. | |
| 2005/0197124 A1* | 9/2005 | Kang et al. | 455/439 |
| 2005/0232212 A1* | 10/2005 | Kang et al. | 370/338 |
| 2005/0239465 A1* | 10/2005 | Lee et al. | 455/436 |
| 2005/0282548 A1* | 12/2005 | Kim et al. | 455/436 |
| 2006/0233198 A1* | 10/2006 | Kim et al. | 370/469 |
| 2006/0234742 A1* | 10/2006 | Kim et al. | 455/513 |
| 2006/0240799 A1* | 10/2006 | Kim et al. | 455/343.2 |
| 2006/0240832 A1* | 10/2006 | Kim et al. | 455/438 |
| 2006/0251100 A1* | 11/2006 | Kim et al. | 370/432 |
| 2006/0259598 A1* | 11/2006 | Kim et al. | 709/222 |
| 2006/0265474 A1* | 11/2006 | Kim et al. | 709/218 |
| 2006/0274697 A1* | 12/2006 | Kim et al. | 370/331 |
| 2007/0091846 A1* | 4/2007 | Kim et al. | 370/331 |
| 2007/0249355 A1* | 10/2007 | Kang et al. | 455/439 |
| 2008/0316973 A1* | 12/2008 | Ann et al. | 370/331 |
| 2009/0219890 A1* | 9/2009 | Zhang et al. | 370/331 |
| 2010/0180111 A1* | 7/2010 | Hahn et al. | 713/150 |

FOREIGN PATENT DOCUMENTS

| | | |
|---|---|---|
| WO | 2005/025091 | 3/2005 |
| WO | WO 2006/052563 A2 | 5/2006 |

OTHER PUBLICATIONS

Itzik Kitroser: "IEEE 802.16e Handoff Draft" Internet Citation, [Online] Mar. 13, 2003, XP002331124 Retrieved from the Internet: URL: http://www.ieee802,org/16/tge/contrib/C80216e-03_20r1.pdf> [retrieved on Jun. 8, 2005] Section 3 * the whole document * * p. 10, line 5—p. 16, line 13 *.

IEEE Computer Society, et al., "IEEE Standard for Local and Metropolitan Area Networks, Part 16: Air Interface for Fixed Broadband Wireless Access Systems", IEEE Std 802.16-2004, Oct. 1, 2004.

* cited by examiner

METHOD OF EXECUTING HANDOVER IN BROADBAND WIRELESS ACCESS SYSTEM

CROSS REFERENCE TO RELATED APPLICATION

Pursuant to 35 U.S.C. §119, this application claims the benefit of earlier filing date and right of priority to Korea Application No. 10-2005-24697, filed Mar. 24, 2005, and Korean Application No. 10-2006-20731, filed Mar. 4, 2006, the contents of which are hereby incorporated by reference herein in their entirety.

FIELD OF THE INVENTION

The present invention relates to a broadband wireless access system, and more particularly, to a method of clearly defining the primitives used for the protocol stack within the mobile station and the protocol stack within the base station, in order to allow effective handover to be performed.

BACKGROUND ART

The system of the IEEE 802.16e that is undergoing international standardization with respect to broadband wireless access systems, does not have a layered architecture comprised of a HLR (Home Location Register), a VLR (Visitor Location Register), a MSC (Mobile Switching Center), a BSC (Base Station Controller), a RNC (Radio Network Controller), and the like, as in the existing 2 G and 3 G mobile communication systems, but instead, is comprised of only a MSS (Mobile Subscriber Station), a BS (Base Station) and a ASA (Authentication Service Authorization).

The broadband wireless access system defines the protocols of the MAC (Medium Access Control) layer and the PHY (PHYsical) layer that are common between the base station and the mobile station (MSS). FIG. 1 depicts an exemplary protocol layer architecture for a broadband wireless access system.

The related art procedures to perform handover of a mobile terminal from one base station to another base station are as follows:

1) Cell Selection

The mobile station can obtain information related to neighbor base stations by using a neighbor base station advertisement message (e.g., MOB_NBR-ADV) that is broadcast by a serving base station or by using scanning.

2) Handover Decision and Initiation

The decision to perform handover of a mobile station to another base station can be initiated by the mobile station or by the current serving base station.

3) Target BS Scanning

The mobile station should perform scanning on the target base station in order to obtain downlink and uplink channels and their synchronization.

4) Network Re-entry

The mobile station and target base station should perform ranging in order to allow network re-entry for the mobile station.

5) Termination of Service

Upon performing handover to another base station, the mobile station ends all services with the previous base station.

In the related art, the messages related to handover will be explained as follows:

1) MOB_MSHO-REQ message

To request handover, the mobile station sends a MOB_M-SHO-REQ message to the base station. The MOB_MSHO-REQ message includes IDs of target base stations for handover recommended by the mobile station, preamble index values, CINR values, HO-IDs, and the like.

2) MOB_BSHO-RSP message

Upon receiving the MOB_MSHO-REQ message, the base station sends a MOB_BSHO-RSP message to the mobile station as a response.

3) MOB_BSHO-REQ message

This is a message sent to the mobile station, by the base station that is currently serving that mobile station, in order to request handover to another base station. The MOB_BSHO-REQ message can include information about neighbor base stations that have been recommended by the base station.

4) MOB_HO-IND message

After receiving the MOB_BSHO-RSP or the MOB_BSHO-REQ messages and upon determining a target base station to which handover is to be ultimately performed, the mobile station releases the connection with the currently serving base station, and this MOB_HO-IND message is sent when handover is about to be performed to another base station.

FIG. 2 depicts the procedures for performing handover in a broadband wireless access system according to the related art.

(1) The mobile station obtains related information of the neighbor base stations through scheduling procedures and neighbor base station broadcast messages.

(2) The mobile station transmits to a currently serving base station a message for requesting handover. Here, recommended base stations based upon the information obtained through the scanning procedure are included in the transmission.

(3) Upon receiving this request message, the currently serving base station transmits, to the recommended base stations, a handover pre-notification message (HO-pre-notification) that include values, such as a mobile station identifier, the required bandwidth, connectivity parameters, and the like.

(4) In response, the recommended base stations transmit a handover pre-notification response message (HO-pre-notification-rsp).

(5) Upon checking the response message of the recommended base stations, the currently serving base station determines a target base station that is appropriate for the mobile station and sends a handover confirm message (HO-confirm) and sends a handover response message (MOB-HO-RSP) to the mobile station.

(6) The mobile station finally sends a MOB_HO-indication message to the base station for performing handover.

(7) The mobile station performs ranging with the base station to which handover is to be performed.

As explained above, in the related art, the messages used by the mobile station to perform scanning that are transmitted and received with the base station are defined, but the operations actually related to scanning are not defined for the protocol stack (layers) within the mobile station and the protocol stack (layers) within the base station. Namely, there are no definitions for the primitives with respect to information transferred between the MAC layer and upper management entity via the NCMS (Network Control Management System), within the protocol stacks of the mobile station and the base station, respectively.

SUMMARY

One aspect of the present invention involves the recognition by the present inventors of the drawbacks in the related art as explained above. In order to address such problems, the present invention provides a method of defining the primitives between an upper management layer and the MAC layer in order to specify and clarify the operations within the protocol stack layers in a broadband wireless access system to allow a mobile station to perform handover.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

DETAILED DESCRIPTION

The present invention is described as being implemented in a broadband wireless access system, such as a 802.16e network. However, the present invention may also be adapted and implemented in communication systems operating under other types of communication specifications (e.g., 802.16g, 802.21, 802.11u, etc.), because the concepts and teachings of the present invention could be applied to various communication schemes that operate in a similar manner based upon common techniques. Non-limiting exemplary embodiments of the present invention are explained below with reference to the attached Figures.

Also, certain aspects of the present invention will be described with respect to particular names for the entities, interfaces, primitives, messages, etc., but those skilled in the art will clearly understand that such names are non-limiting, as other names (label, terms, etc.) may also be used as long as their functions correspond with those taught by the present invention.

The present invention provides a method that allows an entity that performed management or control of a system (mobile station or base station) to manage the MAC layer and the PHY layer by transferring primitives from a MAC layer, through a NCMS (Network Control Management System), to the necessary upper management entity. In particular, when the mobile station performs scanning, a method of defining the primitives that need to be transferred between the MAC layer and the upper management entity via the NCMS in the protocol stacks within the mobile station and the base station is provided.

Hereafter, the management entity refers to all entities that interface with the NCMS, and can be any logical management entity or physical management entity that exists in the IP layer or its upper layer within a device. The operation of the present invention may look as if the NCMS directly sends (delivers) the primitives, because communication is performed from the upper management entity, via the NCMS, to the Management SAP (M-SAP) or Control SAP (C-SAP).

Figure 1:
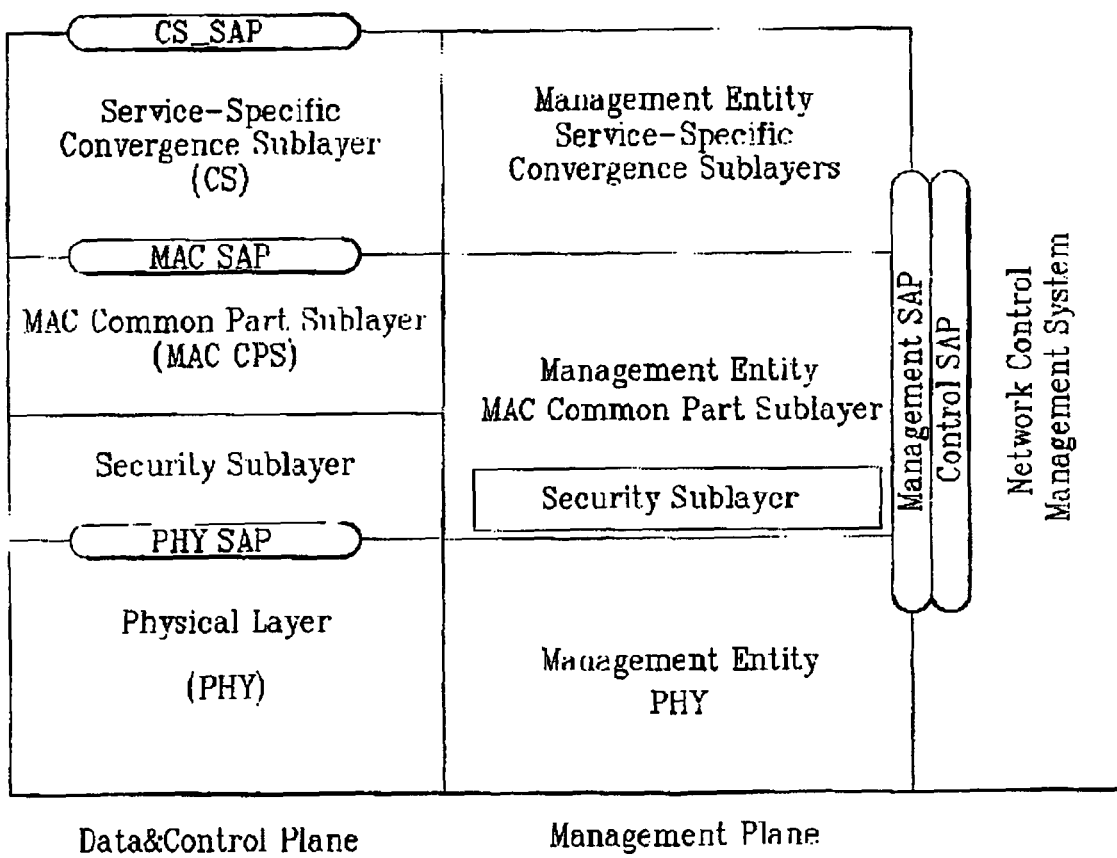
FIG. 1 depicts an exemplary protocol layer architecture for a broadband wireless access system.
Figure 2:
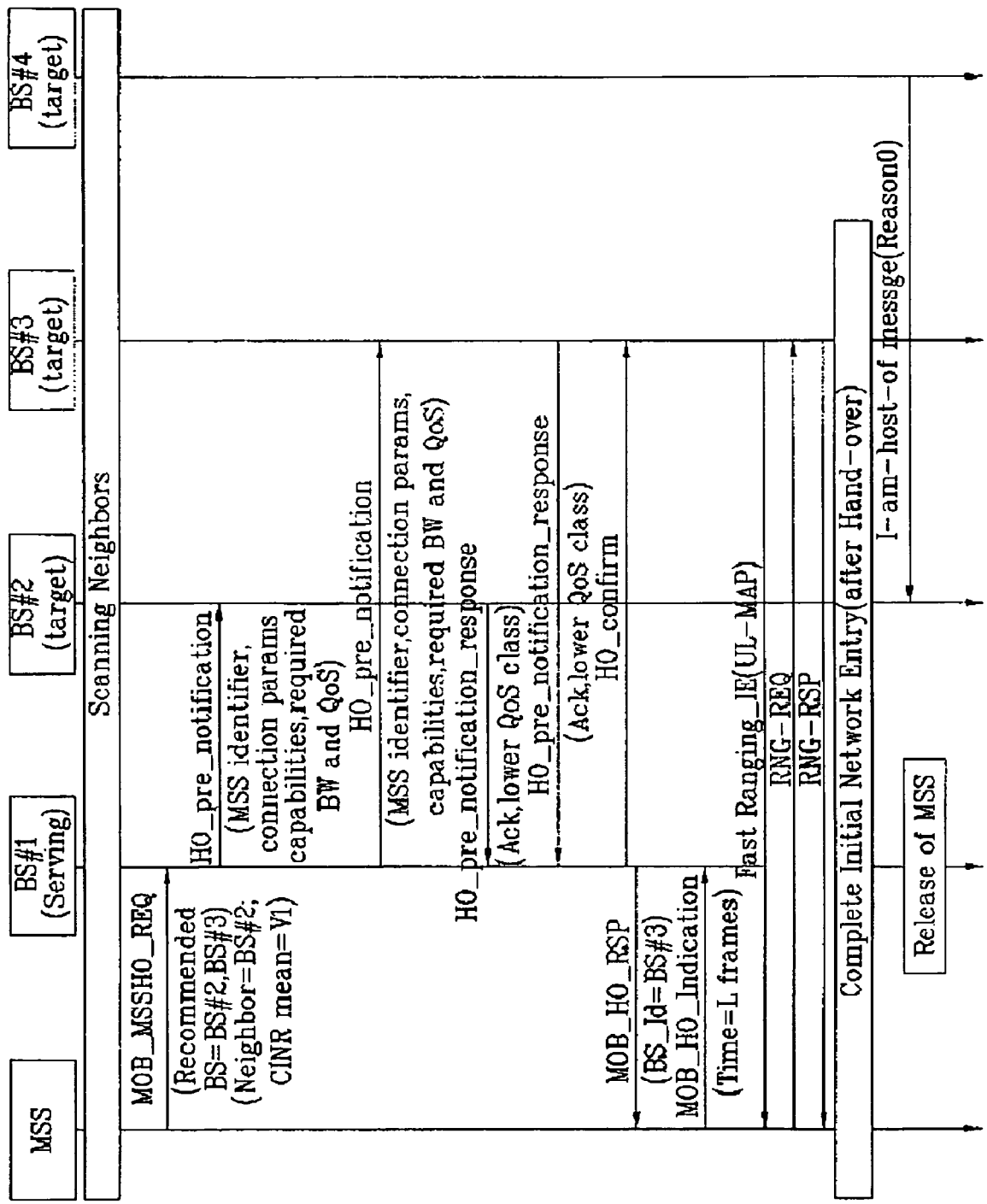
FIG. 2 depicts the procedures for performing handover in a broadband wireless access system according to the related art.

The upper management entity used in the present invention can be located above a layer management entity within a protocol stack as shown in FIG. 1, and be divided into a physical or logical upper management entity that communicates through the NCMS or management SAP of a layer management entity. The upper management entity may exist within a particular protocol stack or may exist as a separate and independent system or stack, but will be conceptually referred to as an upper management entity.

Figure 3:
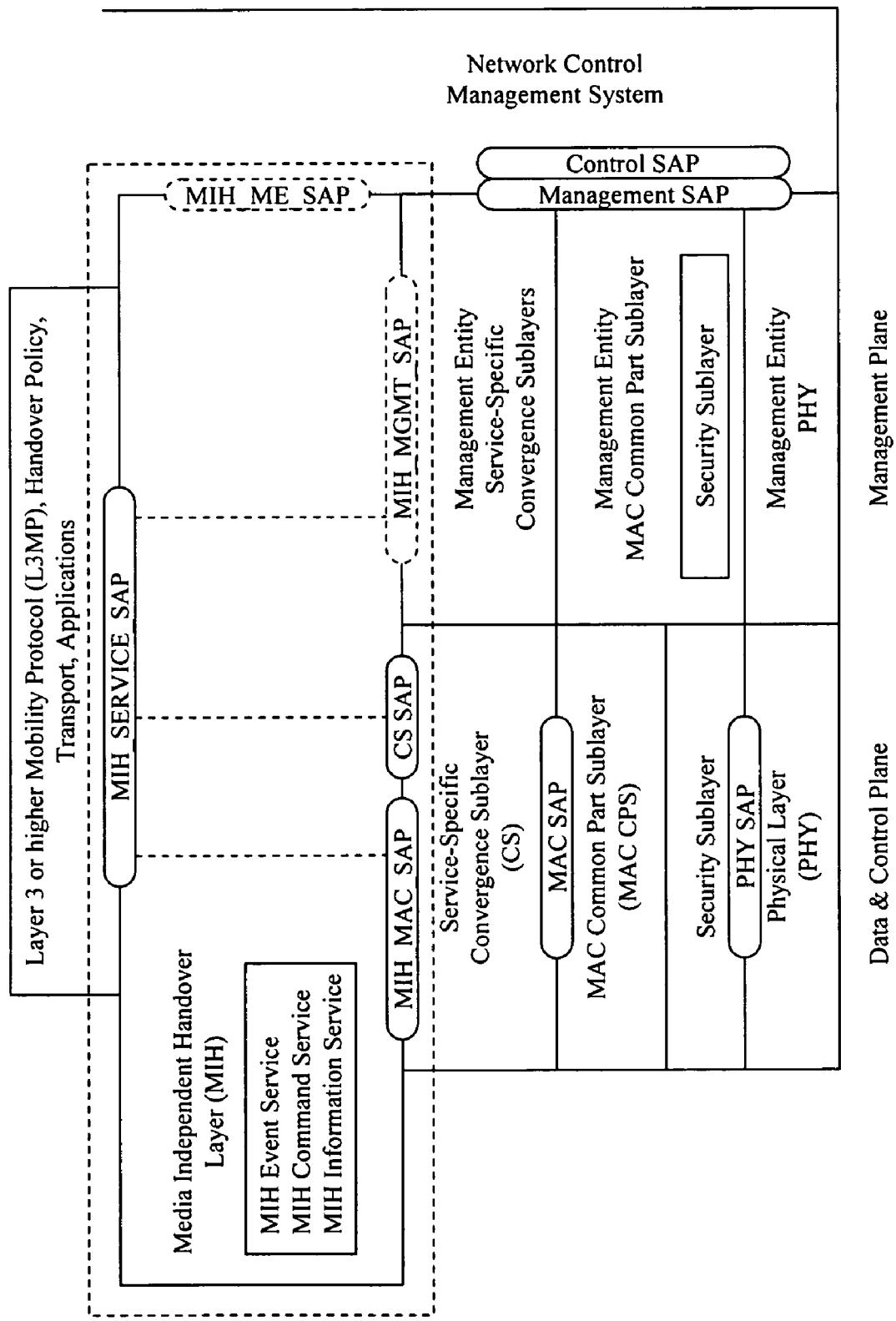
FIG. 3 depicts an exemplary protocol architecture model that considers Media Independent Handover (MIH).

FIG. 3 depicts an exemplary protocol architecture model that considers Media Independent Handover (MIH).

The primitives provided by the present invention are delivered (transferred) to the NCMS (Network Control & Management System) via a Management SAP (M-SAP) or a Control SAP (C-SAP), and the NCMS can deliver (transfer) the primitives to the necessary locations including the upper management entities.

The M-SAP can have the functions for performing system configuration, for monitoring statistics, for notifications/triggers, etc., but are not limited to only these functions. The C-SAP can have the functions for performing handovers (e.g., notification of HO request from MS, etc.), for idle mode mobility management (e.g., mobile entering idle mode), for subscriber and session management (e.g., mobile requesting session setup), for radio resource management, etc., but are not limited to only these functions. Although the primitives of the present invention may be distinguished according to their functions above, such primitives can be delivered through the M-SAP and/or C-SAP.

Figure 4:
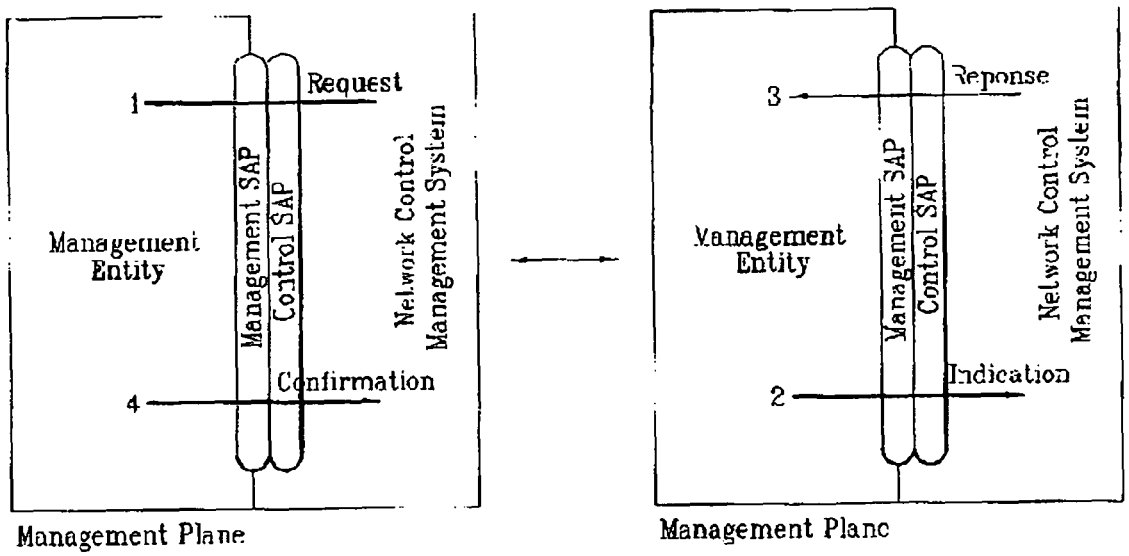
FIGS. 4 and 5 depict the principles of how the primitives operate according to the present invention.
Figure 5:
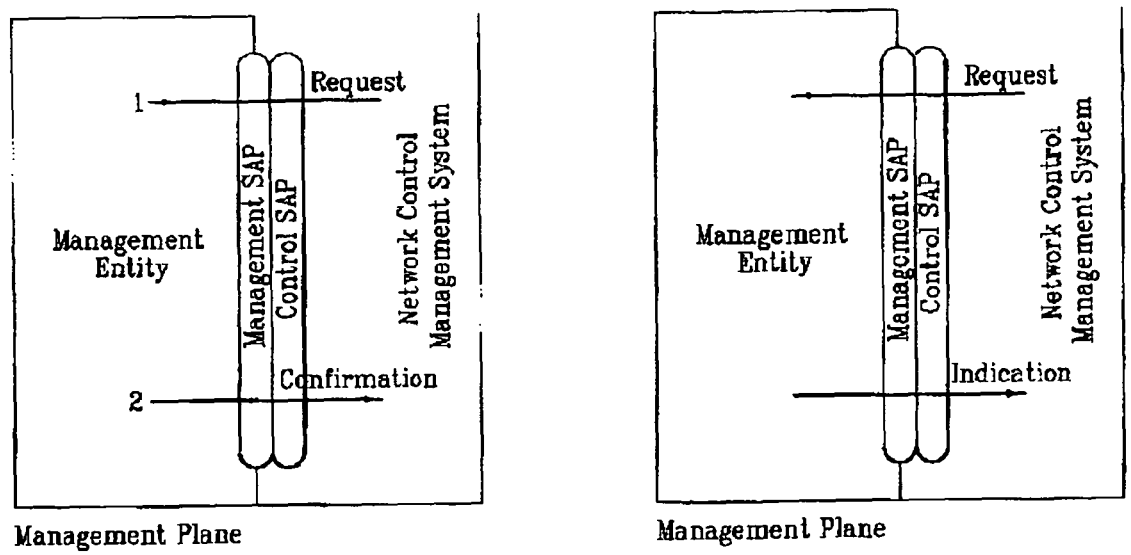

FIGS. 4 and 5 depict the principles of how the primitives operate according to the present invention. Primitives that require cooperation with a remote entity are shown in FIG. 4, while primitives that are only delivered within a local stack are shown in FIG. 5.

As shown in FIG. 4, when there is cooperation with a remote entity, a pair of operations comprising a Request and Confirmation or comprising a Response and Indication are performed.

As shown in FIG. 5, when operations occur within a local stack, there may be two situations: mutual exchanges between the management entity and the NCMS (i.e., a bidirectional operation) or a unidirectional operation. For bidirectional operation, the delivery from the management entity through the M-SAP/C-SAP to the NCMS is called a Request, and its response that is transmitted is called an Indication. For unidirectional operation, the delivery from the management entity through the M-SAP/C-SAP to the NCMS is called a Request, and a unidirectional delivery in the opposite direction is called an Indication.

The primitives according to the present invention may be used for a multi-mode mobile station in which a management entity instructs a corresponding mode or when the corresponding mode delivers information to the entity that manages all the multi-modes. In such case, the following two situations can exist.

First, when the primitives are delivered from the MIH layer or MIH function to a lower layer, the MIH (layer or function) may interpret the information (e.g., commands, etc.) received from an upper layer when delivering the corresponding primitive or the upper layer information (command) may be mapped with the commands of the present invention and transmitted.

Second, when the primitives are delivered from the lower layer to the MIH layer or MIH function, the MIH (layer or function) may interpret the primitive received from the lower layer when transmitting the corresponding primitive (i.e., a unified primitive defined at the MIH) to be delivered to the upper layer or the primitive of the lower layer and the primitive to be sent to the upper layer may be simply mapped and then transmitted.

When used in Media Independent Handover (MIH), the primitives defined by the present invention may be delivered through the SAP between the NCMS and the MIH or the SAP between the management entity and the MIH such that MIH techniques can be achieved.

A method of executing handover in a broadband wireless access system comprises: receiving, by a mobile station MAC layer, a handover request message from a serving base station; delivering by the mobile station MAC layer, to an upper management entity through a first primitive, the information included in the handover request message from a serving base station; responding, by the upper management entity, to the mobile station MAC layer by delivering a second primitive; and sending, by the mobile station MAC layer, a handover request message to the serving base station and performing handover to the target base station.

A method of executing handover in a broadband wireless access system comprises: informing, that a mobile station has been handed over to another base station, by a serving base station MAC layer delivering a third primitive to an upper management entity; instructing, that the mobile station is to perform a network re-entry procedure with the target base station, by a mobile station upper management layer delivering a fourth primitive to a mobile station MAC layer; transmitting a RNG-REQ message by the mobile station MAC layer to the target base station; upon receiving the RNG-REQ message, the target base station MAC layer delivers the information included in the RNG-REQ message to an upper management entity of the target base station through sending of a fifth primitive; responding, by the upper management entity of the target base station, by delivering a sixth primitive; transmitting a RNG-RSP message by the target base station to the mobile station MAC layer; and upon receiving the RNG-RSP message, the mobile station MAC layer delivers the information included in the RNG-RSP message to the mobile station upper management entity via a seventh primitive.

To allow the mobile station to execute handover by using the MAC messages transmitted and received with the base station and the primitives provided by the present invention, the embodiments that explain the operation performed between the upper management entity and the MAC layer via the NCMS within the mobile station and the base station, will be described with reference to FIGS. 6 and 7.

Figure 6:
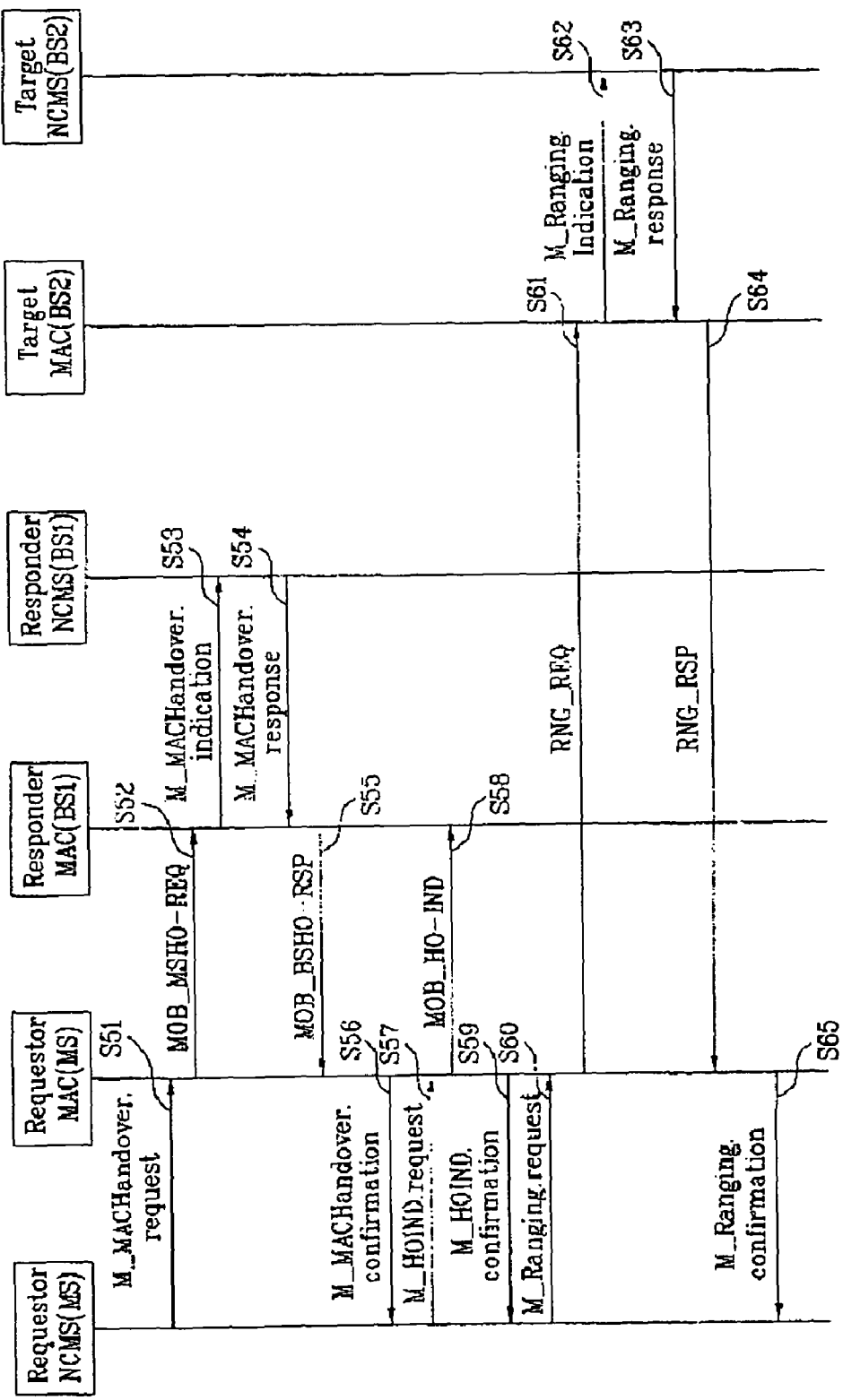
FIG. 6 depicts a flow chart of an exemplary embodiment of the present invention.

FIG. 6 depicts a flow chart of an exemplary embodiment of the present invention, wherein the mobile station requests handover to the base station by the MOB_MSHO-REQ message.

The mobile station upper management entity sends an M_MACHandover.request through the NCMS to the mobile station MAC layer [S51], and instructs the mobile station MAC layer to send a MOB_MSHO-REQ message to the serving base station (BS1) MAC layer. The mobile station MAC layer then proceeds to send the MOB_MSHO-REQ message to the serving base station (BS1) MAC layer [S52].

The serving base station MAC layer informs its upper management entity about the mobile station handover request by delivering a M_MACHandover.indication primitive [S53]. The serving base station upper management entity delivers a M_MACHandover.response primitive to its MAC layer to inform the results of the mobile station handover request [S54]. The serving base station MAC layer transmits a MOB_BSHO-RSP message to the mobile station MAC layer [S55].

The mobile station MAC layer delivers an M_MACHandover.confirmation primitive to its upper management entity to inform about the handover request result [S56]. After determining the ultimate target base station to which handover is to be made, the mobile station upper management entity delivers an M_HOIND.request primitive to its MAC layer to inform this matter [S57]. The mobile station MAC layer transmits an MOB_HO-IND message to the serving base station [S58], and handover is performed to the target base station (BS2).

The mobile station MAC layer delivers the M_HOIND.confirmation primitive to the mobile station upper management entity, in order to inform the MOB_HO-IND message transmission result to the mobile station upper management entity [S59]. The mobile station upper management entity send a M_Ranging.request primitive to its MAC layer [S60] to instruct that the mobile station should perform a network re-entry procedure with respect to the target base station.

The mobile station MAC layer sends a RNG-REQ message to the target base station [S61]. Upon receiving the RNG-REQ message, the target base station MAC layer delivers the information included in the RNG-REQ message to its upper management entity through an M-Ranging.indication primitive [S62]. The target base station upper management entity responds to this by transmitting an M_Ranging.response primitive [S63]. The target base station transmits a RNG-RSP message to the mobile station MAC layer [S64]. Upon receiving the RNG-RSP message, the mobile station MAC layer delivers the information included in the RNG-RSP message to its upper management entity through an M_Ranging.confirmation primitive [S65].

Figure 7:
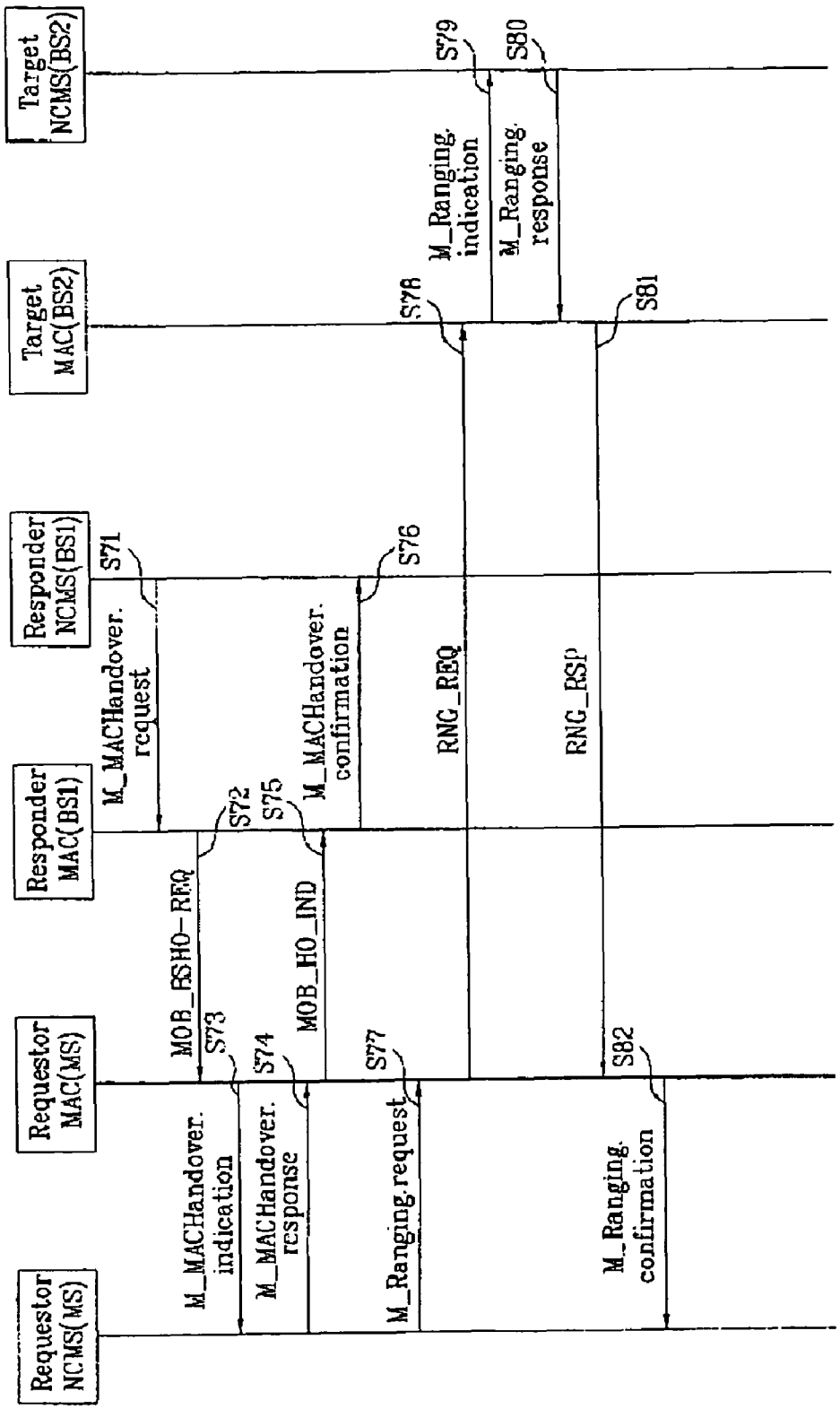
FIG. 7 depicts a flow chart of another exemplary embodiment of the present invention.

FIG. 7 depicts a flow chart of another exemplary embodiment of the present invention, wherein the base station requests handover to mobile station by the MOB_BSHO-REQ message.

The serving base station (BS1) upper management entity transmits an M_MACHandover.request primitive to its MAC layer [S71], and instructs its MAC layer to send a handover request message to the mobile station. The serving base station MAC layer transmits a MOB_BSHO-REQ message to the mobile station [S72]. The mobile station MAC layer delivers the serving base station handover request message to its upper management entity via an M_MACHandover.indication primitive [S73]. The mobile station upper management entity delivers a M_MACHandover.response primitive to its MAC layer to respond [S74]. The mobile station MAC layer transmits a MOB_HO-IND message to the serving base station [S75], and performs handover to the target base station (BS2).

The serving base station MAC layer delivers a M_MACHandover.confirmation primitive to its upper management entity [S76], to inform that the mobile station has been handed over to another base station.

The mobile station upper management entity delivers a M-Ranging.request primitive to its MAC layer in order to instruct the mobile station to perform a network re-entry procedure to the target base station [S77]. The mobile station MAC layer transmits a RNG-REQ message to the target base station [S78].

Upon receiving the RNG-REQ message, the target base station MAC layer delivers the information included in the RNG-REQ message to its upper management entity via an M_Ranging.indication primitive [S79]. The target base station upper management entity responds by delivering an M_Ranging.response primitive [S80]. The target base station transmits a RNG-RSP message to the mobile station MAC layer [S81]. Upon receiving the RNG-RSP message, the mobile station MAC layer delivers the information included in the RNG-RSP message to its upper management entity via an M_Ranging.confirmation primitive [S82].

As explained with reference to FIGS. 6 and 7, the primitives transmitted through the Management SAP (M_SAP) and/or the Control SAP (C_SAP) to perform handover requested by the mobile station or the base station will be explained in more detail hereafter.

(1) M_MACHandover.request Primitive

1) Function

The M_MACHandover.request is a primitive transmitted by an upper management entity of the mobile station to instruct its MAC layer to transmit a handover request message to a base station 2) Semantics

```
M_MACHandover.request
{
Source,
Destination,
N_Recommended
Neighbor BS ID,
BS CINR Mean,
Current link identifier,
HandoverMode,
Current link action
}
```

The following table shows an exemplary data format of the M_MACHandover.request primitive.

3) Time of Formation

The M_MACHandover.request primitive is formed when the upper management entity of the mobile station instructs the MAC layer to transmit a handover request message (MOB_MSHO-REQ) to the base station.

4) Effect when Received

After the MAC layer of the mobile station receives the M_MACHandover.request primitive, it transmits the MOB_MSHO-REQ to the currently connected base station.

(2) M_MACHandover.indication Primitive

1) Function

The M_MACHandover.indication is a primitive used by a MAC layer of the base station to deliver the request for handover received from the mobile terminal to its upper management entity.

2) Semantics

```
M_MACHandover.indication
{
Source,
Destination,
MS MAC Address,
N_Recommended
Neighbor BS ID,
BS CINR Mean,
Current link identifier,
HandoverMode,
Current link action
}
```

The following table shows an exemplary data format of the M_MACHandover.indication primitive.

TABLE 1

| Name | Type | Valid Range | Description |
|---|---|---|---|
| Source | | | Start point of request |
| Destination | | | Target point to which request is delivered |
| N Recommended | | | The number of target base stations to which the MS can handover |
| Neighbor BS ID | | | ID of handover-available neighboring BS recommended by the MS |
| BS CINR Mean | | | Mean CINR value of neighboring BS |
| Current link identifier | | | Identifier of current link |
| HandoverMode | Enumeration | Make before break Break before make | Indicates whether previous link connection should be released (broken) before making connection with new link |
| Current link action | Bitmap | | 0: LINK_DISCONNECT 1: LINK_LOW-POWER 2: LINK_POWER_DOWN 3: LINK_NO_ACTION 4: Reserved |

TABLE 2

| Name | Type | Valid Range | Description |
|---|---|---|---|
| Source | | | Start point of indication |
| Destination | | | Target point to which indication is delivered |
| MS MAC Address | | | MAC address of MS which has requested handover |
| N_Recommended | | | The number of target base stations to which the MS can handover |
| Neighbor BS ID | | | ID of handover-available neighboring BS recommended by the MS |
| BS CINR Mean | | | Mean CINR value of neighboring BS |
| Current link identifier | | | Identifier of current link |
| HandoverMode | Enumeration | Make before break Break before make | Indicates whether previous link connection should be released (broken) before making connection with new link |
| Current link action | Bitmap | | 0: LINK_DISCONNECT 1: LINK_LOW-POWER 2: LINK_POWER_DOWN 3: LINK_NO_ACTION 4: Reserved |

3) Time of Formation

The M_MACHandover.request primitive is formed when the MAC layer of the base station delivers the MOB_MSHO-REQ message to its upper management entity after receiving it from the mobile station.

4) Effect when Received

When the upper management entity of the base station receives the M_MACHandover.indication primitive, it determines a base station recommended for handover of the mobile station through a backbone message with target base stations.

(3) M_MACHandover.response Primitive

1) Function

The M_MACHandover.response is a primitive used by the upper management entity of the base station to instruct its MAC layer to deliver results on the handover request of the mobile station.

2) Semantics

```
M_MACHandover.response
{
Source,
Destination,
N_Recommended
Neighbor BS ID,
HO Process Optimization,
HOID
}
```

The following table shows an exemplary data format of the M_MACHandover.response primitive.

TABLE 3

| Name | Type | Valid Range | Description |
|---|---|---|---|
| Source | | | Start point of response |
| Destination | | | Target point to which response is delivered |
| N_Recommended | | | The number of target base stations to which the MS can handover |
| Neighbor BS ID | | | ID of neighboring BS for handover of MS |
| HO Process Optimization | | | This field includes information that can be maintained during handover of MS to corresponding BS. If corresponding bit is set to 1, this indicates information that can be continuously maintained even upon handover to corresponding BS. Bit #0: SBC-REQ/RSP message Bit #1: PKM-REQ/RSP message Bit #2: REG-REQ/RSP message Bit #3: IP Address Bit #4: Time of Day Acquisition message Bit #5: TFTF message Bit #6: Information related to all services and operations |
| HOID | | | ID to be used for executing initial ranging during handover of MS to target base station |

3) Time of Formation

The M_MACHandover.response primitive is formed when the upper management entity of the base station delivers the results on the handover request of the mobile station to its MAC layer.

4) Effect when Received

When the MAC layer of the base station receives the M_MACHandover.response primitive, it transmits an MOB_BSHO-RSP message to the mobile station.

(4) M_MACHandover.confirmation Primitive

1) Function

The M_MACHandover.confirmation is a primitive used by the MAC layer of the mobile station to deliver the results on the handover request received from the base station to its upper management entity.

2) Semantics

```
M_MACHandover.confirmation
{
Source,
Destination,
N_Recommended
Neighbor BS ID,
HO Process Optimization,
HOID,
Current link identifier,
HandoverAck
}
```

The following table shows an exemplary data format of the M_MACHandover.confirmation primitive.

3) Time of Formation

The M_MACHandover.confirmation primitive is formed when the MAC layer of the mobile station to deliver the results on the handover request to its upper management entity, after receiving the MOB_BSHO-RSP message from the base station 4) Effect when Received When the upper management entity of the mobile station receives the M_MACHandover.confirmation primitive, it determines whether to execute handover to a target base station.

(5) M_HOIND.request primitive

1) Function

The M_HOIND.request is a primitive used by the upper management entity of the mobile station to inform the MAC layer about a target base station to perform final handover after determining the target base station.

2) Semantics

```
M_HOIND.request
{
Source,
Destination,
HO_IND_type,
Target_BS_ID,
Current link action
}
```

The following table shows an exemplary data format of the M_HOIND.request primitive.

TABLE 4

| Name | Type | Valid Range | Description |
|---|---|---|---|
| Source | | | Start point of confirmation |
| Destination | | | Target point to which confirmation is delivered |
| N_Recommended | | | The number of target base stations to which the MS can handover |
| Neighbor BS ID | | | ID of target BS for handover of MS |
| HO Process Optimization | | | This field includes information that can be maintained during handover of MS to corresponding BS. If corresponding bit is set to 1, this indicates information that can be continuously maintained even upon handover to corresponding BS. Bit #0: SBC-REQ/RSP message Bit #1: PKM-REQ/RSP message Bit #2: REG-REQ/RSP message Bit #3: IP Address Bit #4: Time of Day Acquisition message Bit #5: TFTF message Bit #6: Information related to all services and operations |
| HOID | | | ID to be used for executing initial ranging during handover of MS to target base station |
| Current link identifier | | | Identifier of current link |
| HandoverAck | Enumeration | 0 or 1 | 1: Initiate Handover 0: Abort Handover |

TABLE 5

| Name | Type | Valid Range | Description |
|---|---|---|---|
| Source | | | Start point of request |
| Destination | | | Target point to which request is delivered |
| HO_IND_type | Enumeration | Handover<br>Handover cancel<br>Handover reject | It indicates whether handover to target BS to be executed, canceled or rejected |
| Target BS ID | | | ID of target BS determined for handover of MS |
| Current link action | Bitmap | | 0: LINK_DISCONNECT<br>1: LINK_LOW-POWER<br>2: LINK_POWER_DOWN<br>3: LINK_NO_ACTION<br>4: Reserved |

3) Time of Formation

The M_HOIND.request primitive is formed when the upper management entity of the mobile station instructs its MAC layer to perform handover to the target base station, after determining the target base station.

4) Effect when Received

When MAC layer of the mobile station receives the M_HOIND.request primitive, it transfers a MOB_HO-IND message to the base station, and in this case, if the HO_IND-type indicates handover, the mobile station performs handover to the target base station.

(6) M_HOIND.confirmation Primitive

1) Function

The M_HOIND.confirmation is a primitive used by the MAC layer of the mobile station to inform the upper management entity that it has transmitted the MOB_HO-IND message to the base station, after transmitting it.

2) Semantics

---
M_HOIND.confirmation
{
Source,
Destination,
ResultCode,
Current link action,
HandoverStatus
}
---

The following table shows an exemplary data format of the M_HOIND.confirmation primitive.

3) Time of Formation

The M_HOIND.confirmation primitive is formed when the MAC layer of the mobile station delivers results on transmission of the MOB_HO-IND message to the upper management entity of the mobile station, after transmitting the MOB_HO-IND message to the base station 4) Effect when Received When the upper management entity receives the M_HOIND.confirmation primitive, it can recognize whether the MOB_HO-IND message has been successfully transmitted or not.

(7) M_Ranging.request Primitive

1) Function

The M_Ranging.request is a primitive used to request ranging. The upper management entity of the mobile station can request the MAC layer to perform ranging by using the M_Ranging.request primitive.

2) Semantics

---
M_Ranging.request
{
RangingType
}
---

The following table shows an exemplary data format of the M_Ranging.request primitive.

TABLE 6

| Name | Type | Valid Range | Description |
|---|---|---|---|
| Source | | | Start point of confirmation |
| Destination | | | Target point to which confirmation is delivered |
| Result Code | Enumeration | Success<br>Fail | It indicates whether transmission of MOB_HO-IND is successful or failed |
| Current link action | Bitmap | | 0: LINK_DISCONNECT<br>1: LINK_LOW-POWER<br>2: LINK_POWER_DOWN<br>3: LINK_NO_ACTION<br>4: Reserved |
| HandoverAck | Enumeration | 0 or 1 | 0: Abort Handover<br>1: Initiate Handover |

TABLE 7

| Name | Type | Valid Range | Description |
| --- | --- | --- | --- |
| RangingType | Enumeration | Initial Handoff Location Update Periodic | Type of ranging |

3) Time of Formation

The M_Ranging.request primitive is formed by the upper management entity when the mobile station updates its location in an idle mode so as to be connected with a network at an initial stage after handover, attempts a network connection in the idle mode, or periodically performs ranging.

4) Effect when Received

When the upper management entity receives the M_Ranging.request primitive, it performs ranging to transmit an RNG-REQ MAC management message or a ranging CDMA code by adding a corresponding required LV (Type Length Value) therein according to a RangingType via an air interface.

(8) M_Ranging.indication Primitive

1) Function

The M_Ranging.indication is a primitive used to inform that a request for ranging from the upper management entity has been received through a MAC management message.

2) Semantics

M_Ranging.indication
{
MS Address,
CDMA Code,
MAC Version,
Required Downlink Burst Profile,
Serving BS ID,
Target BS ID,
HO Indication,
Location Update Request,
Paging Controller ID
}

The following table shows an exemplary data format of the M_Ranging.indication primitive.

TABLE 8

| Name | Type | Valid Range | Description |
| --- | --- | --- | --- |
| MS Address | MAC Address | Any valid individual MAC address | MAC address of MS that has requested ranging |
| MAC Version | Enumeration | IEEE Std 802.16-2001 IEEE Std 802.16c-2002 and its predecessors IEEE Std 802.16a-2003 and its predecessors IEEE Std 802.16-2004 | Version of MAC supported by MS |
| Required Downlink Burst Profile | | | Required DIUC value of Downlink Burst Profile |
| Serving BS ID | | | ID of serving BS in case of handover, in case of updating location in idle mode, in case of network entry in idle mode, and in case of performing ranging |
| Target BS ID | | | ID of target BS in case of handover, in case of updating location in idle mode, in case of network entry in idle mode, and in case of performing ranging |
| HO Indication | | | Indicator for indicating ranging performed by MS while performing handover |
| Location Update Request | | | Indicator for indicating ranging for performing location updating by MS in idle mode |
| Paging Controller ID | | | ID of paging controller for managing location updating or network entry of MS in idle mode as occurs |

3) Time of Formation

The M_Ranging.indication primitive is formed when the MAC layer receives the RNG-REQ or the ranging code via the air interface 4) Effect when Received The MAC layer analyzes the received ranging request and forms a M_Ranging.response primitive in response to ranging.

(9) M_Ranging.response Primitive

1) Function

The M_Ranging.response is a primitive used to inform results on the ranging request.

2) Semantics

```
M_Ranging.response
{
MSAddress,
ResultCode,
ManagementCIDs,
Resource Retain Flag,
HO Process Optimization,
Location Update Response,
Paging Information,
Paging Controller ID,
Next Periodic Ranging
}
```

The following table shows an exemplary data format of the M_Ranging.response primitive.

TABLE 9

| Name | Type | Valid Range | Description |
|---|---|---|---|
| MS Address | MAC Address | Any valid individual MAC address | MAC address of MS that has requested ranging |
| ResultCode | Enumeration | Continue Success | Results obtained by processing ranging request |
| Management CIDs | Enumeration | Basic CID Primary Management CID | Management CIDs allocated to MS in case of successful ranging request |
| Resource Retain Flag | | | It indicates whether information of MS is maintained in previous base station or not after handover |
| HO Process Optimization | | | It indicates procedure that may be omitted in performing network entry after handover |
| Location Update Response | Enumeration | Failure Success | It indicates results of location updating in idle mode |
| Paging Information | | | Parameter for informing about paging period and offset, and paging group ID when location updating is successful |
| Paging controller ID | | | ID of entity that manages idle mode |
| Next Periodic Ranging | | | Frame offset informing when is the next periodical ranging in case of sleep mode |

3) Time of Formation

The M_Ranging.response primitive is formed at a time point determined to inform about corresponding results after the M_Ranging.indication primitive is received.

4) Effect when Received

The MAC layer transmits an RNG-RSP and a MAC management message including received parameters through the M_Ranging.indication primitive.

(10) M_Ranging.confirmation Primitive

1) Function

The M_Ranging.confirmation is a primitive used to inform the upper management entity about the results included in the response message of ranging.

2) Semantics

```
M_Ranging.confirmation
{
MSAddress,
ResultCode,
ManagementCIDs,
Resource Retain Flag,
HO Process Optimization,
Location Update Response
```

-continued

```
Paging Information,
Paging Controller ID,
Next Periodic Ranging
}
```

The following table shows an exemplary data format of the M_Ranging.confirmation primitive.

TABLE 10

| Name | Type | Valid Range | Description |
|---|---|---|---|
| MS Address | MAC Address | Any valid individual MAC address | MAC address of MS that has requested ranging |
| ResultCode | Enumeration | Continue Success | Results obtained by processing ranging request |
| Management CIDs | Enumeration | Basic CID Primary Management CID | Management CIDs allocated to MS in case of successful ranging request |
| Resource | | | It indicates whether information of MS |

TABLE 10-continued

| Name | Type | Valid Range | Description |
|---|---|---|---|
| Retain Flag | | | is maintained in previous base station or not after handover |
| HO Process Optimization | | | It indicates procedure that may be omitted in performing network entry after handover |
| Location Update Response | Enumeration | Failure Success | It indicates results of location updating in idle mode |
| Paging Information | | | Parameter for informing about paging period and offset, and paging group ID when location updating is successful |
| Paging controller ID | | | ID of entity that manages idle mode |
| Next Periodic Ranging | | | Frame offset informing when is the next periodical ranging in case of sleep mode |

3) Time of Formation

The M_Ranging.confirmation primitive is formed when the MAC layer receives the RNG-RSP through the air interface.

4) Effect when Received

The upper management entity is informed about the results of ranging.

To implement the various features described above, the present invention can employ various types of hardware and/or software components (modules). For example, different hardware modules may contain various circuits and components necessary to perform the steps of the above method of executing scanning in a broadband wireless access system. Also, different software modules (executed by processors and/or other hardware) may contain various codes and protocols necessary to perform the steps of the present invention method.

For handover (viewpoint of MS MAC), the present invention provides a method of executing handover initiated by a mobile station, comprising: receiving, from a mobile station (MS) Network Control Management System (NCMS), a first primitive that indicates a handover request; sending, to a network, a handover request message; receiving, from the network, a handover response message; and sending, to the MS NCMS, a second primitive that indicates a handover confirmation. The method may further comprise: performing heterogeneous network handover between one or more Points-of-Attachment (POAs) using the first and second primitives, wherein the first and second primitives indicate a target POA of a different type of network. The method may further comprise: receiving, from the MS NCMS, a third primitive that indicates a handover performing indication request; sending, to the network, a handover indication message; and sending, to the MS NCMS, a fourth primitive that indicates a handover performing indication confirmation. The method may further comprise: performing heterogeneous network handover between one or more Points-of-Attachment (POAs) using the third and fourth primitives, wherein the third and fourth primitives indicate a target POA of a different type of network. The first primitive or handover request message comprises target candidates. The target candidates include at least one Point-of-Attachment (POA). The POA includes a base station (BS) or an access point (AP). The first primitive comprises at least one of the number of recommended Points-of-Attachment (POAs), POA identifiers (ex: MAC address), a radio signal quality for a corresponding POA (ex: CINR mean, RSSI, etc.), HO mode, current link action. The HO mode indicates whether to perform HO before breaking a current link or to break the current link before performing HO. The current link action indicates whether to perform disconnecting of a current link, lowering the power of the link, performing power down of the link, performing no action of the link, link resource retain, data forwarding request, bi-casting request, or handoff cancel. The handover response message or second primitive comprises target candidates. The target candidates include at least one Point-of-Attachment (POA). The POA includes a base station (BS) or an access point (AP). The handover response message or second primitive comprises at least one of the number of recommended POAs, HO process optimization, HO ID, POA identifiers, and a radio signal quality for a corresponding POA, link resource retain, data forwarding request, bi-casting request, handoff cancel, HO abort/fail reason. The HO process optimization indicates whether a previous IP address can be used for a target POA. The HO ID is to be used for improved HO ranging. The third primitive or handover indication message comprises target candidates. The target candidates include at least one Point-of-Attachment (POA). The POA includes a base station (BS) or an access point (AP). The third primitive or handover indication message comprises a HO indication type. The HO indication type includes HO, HO cancel, or HO reject. The third primitive or handover indication message comprises a current link action that indicates whether to perform disconnecting of a current link, lowering the power of the link, performing power down of the link, performing no action of the link, link resource retain, data forwarding request, bi-casting request, handoff cancel. The fourth primitive comprises a result code that indicates a success or failure of a result of message transmission to the network.

For handover (viewpoint of network/BS NCMS), the present invention provides a method of executing handover initiated by a network, comprising: receiving, from a mobile station (MS) medium access control (MAC) layer, a handover request message; sending, to a Network NCMS (Network Control Management System), a first primitive that indicates a handover performing indication; receiving, from the Network NCMS, a second primitive that indicates a handover performing response; and sending, to the MS MAC layer, a handover response message. The Network NCMS supports a management function of a mobile station, and is a layer in an independent entity that is a management entity. The method may further comprise: performing heterogeneous network handover between one or more Points-of-Attachment (POAs)

using the first and second primitives, wherein the first and second primitives indicate a target POA of a different type of network. The first primitive or handover request message comprises target candidates. The target candidates include at least one Point-of-Attachment (POA). The POA includes a base station (BS) or an access point (AP). The first primitive or handover request message comprises at least one of the number of recommended Points-of-Attachment (POAs), POA identifiers, a radio signal quality for a corresponding POA, HO mode, current link action. The HO mode indicates whether to perform HO before breaking a current link or to break the current link before performing HO. The current link action indicates whether to perform disconnecting of a current link, lowering the power of the link, performing power down of the link, performing no action of the link, link resource retain, data forwarding request, bi-casting request, or handoff cancel. The handover response message or second primitive comprises target candidates. The target candidates include at least one Point-of-Attachment (POA). The POA includes a base station (BS) or an access point (AP). The handover response message or second primitive comprises at least one of the number of recommended POAs, HO process optimization, HO ID, POA identifiers, and a radio signal quality for a corresponding POA, link resource retain, data forwarding request, bi-casting request, handoff cancel, HO abort/fail reason. The HO process optimization indicates whether a previous IP address can be used for a target POA. The HO ID is to be used for improved HO ranging.

For handover (viewpoint of MS MIH), the present invention provides a method of executing handover initiated by a mobile station, comprising: sending, to a mobile station (MS) Network Control Management System (NCMS), a first primitive that indicates a handover request; and receiving, from the MS NCMS, a second primitive that indicates handover confirmation. The method may further comprise: performing heterogeneous network handover between one or more POAs using the first and second primitives, wherein the first and second primitives indicate a target POA of a different type of network. The method may further comprise, before the receiving step: waiting to receive the second primitive for the purpose of performing re-transmission of the first primitive if necessary. The waiting is performed by using a timer. The first primitive comprises target candidates. The target candidates include at least one Point-of-Attachment (POA). The POA includes a base station (BS) or an access point (AP). The first primitive comprises at least one of the number of recommended Points-of-Attachment (POAs), POA identifiers, a radio signal quality for a corresponding POA, HO mode, current link action. The HO mode indicates whether to perform HO before breaking a current link or to break the current link before performing HO. The current link action indicates whether to perform disconnecting of a current link, lowering the power of the link, performing power down of the link, performing no action of the link, link resource retain, data forwarding request, bi-casting request, or handoff cancel. The second primitive comprises target candidates. The target candidates include at least one Point-of-Attachment (POA). The POA includes a base station (BS) or an access point (AP). The second primitive comprises at least one of the number of recommended POAs, HO process optimization, HO ID, POA identifiers, and a radio signal quality for a corresponding POA, link resource retain, data forwarding request, bi-casting request, handoff cancel, HO abort/fail reason. The HO process optimization indicates whether a previous IP address can be used for a target POA. The HO ID is to be used for improved HO ranging. The method may further comprise: sending, to the MS NCMS, a third primitive that indicates a handover performing indication request; and receiving, from the MS NCMS, a fourth primitive that indicates a handover performing indication confirmation. The method may further comprise: performing heterogeneous network handover between one or more POAs using the third and fourth primitives, wherein the third and fourth primitives indicate a target POA of a different type of network. The third primitive comprises target candidates. The target candidates include at least one Point-of-Attachment (POA). The POA includes a base station (BS) or an access point (AP). The third primitive comprises a HO indication type. The HO indication type includes HO, HO cancel, or HO reject. The third primitive comprises a current link action that indicates whether to perform disconnecting of a current link, lowering the power of the link, performing power down of the link, performing no action of the link, link resource retain, data forwarding request, bi-casting request, handoff cancel. The fourth primitive comprises a result code that indicates a success or failure of a result of message transmission to the network. The method may further comprise: establishing a unified interface to an upper layer of the mobile station for managing messages to and from at least one of a homogeneous network and a heterogeneous network.

For handover (viewpoint of network MIH), the present invention provides a method of executing handover initiated by a network, comprising: receiving, from a network NCMS (Network Control Management System), a first primitive that indicates a handover request; and sending, to the network NCMS, a second primitive that indicates handover confirmation. The method may further comprise: performing heterogeneous network handover between one or more POAs using the first and second primitives, wherein the first and second primitives indicate a target POA of a different type of network. The first primitive comprises target candidates. The target candidates include at least one Point-of-Attachment (POA). The POA includes a base station (BS) or an access point (AP). The first primitive comprises at least one of the number of recommended Points-of-Attachment (POAs), POA identifiers, a radio signal quality for a corresponding POA, HO mode, current link action. The HO mode indicates whether to perform HO before breaking a current link or to break the current link before performing HO. The current link action indicates whether to perform disconnecting of a current link, lowering the power of the link, performing power down of the link, performing no action of the link, link resource retain, data forwarding request, bi-casting request, or handoff cancel. The second primitive comprises target candidates. The target candidates include at least one Point-of-Attachment (POA). The POA includes a base station (BS) or an access point (AP). The second primitive comprises at least one of the number of recommended POAs, HO process optimization, HO ID, POA identifiers, and a radio signal quality for a corresponding POA, link resource retain, data forwarding request, bi-casting request, handoff cancel, HO abort/fail reason. The HO process optimization indicates whether a previous IP address can be used for a target POA. The HO ID is to be used for improved HO ranging. The method may further comprise: establishing a unified interface to an upper layer of the network for managing messages to and from at least one of a homogeneous network and a heterogeneous network.

As for the results of the present invention, when the mobile station performs handover by using the primitives defined according to the present invention, accurate operations within the protocol stack layers can be achieved. Accordingly, Media Independent Handover (MIH) procedures can be achieved because the NCMS and MIH layer can communicate in a direct or indirect manner through use of the primitives.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of executing a handover procedure performed between an entity comprising a management plane and a data plane, and a Network Control Management System ("NCMS") both in a single mobile station, the method performed by the entity within the mobile station and comprising;
   receiving, from the NCMS within the mobile station, a handover request primitive that requests transmission of a mobility handover request message to a serving base station;
   transmitting the mobility handover request message to the serving base station;
   receiving a mobility handover response message from serving base station; and
   sending, to the NCMS within the mobile station, a handover response primitive responsive to the handover request primitive,
   wherein the NCMS interfaces with the entity through a Control Service Access Point or a Management Service Access Point, and the Management Service Access Point is used for performing system configuration, monitoring statistics, and notifications/triggers and the Control Service Access Point is used for performing handovers, idle mode mobility management, subscriber and session management and radio resource management.

2. The method of claim 1, wherein the handover request primitive include a list of candidate target base stations and the number of candidate target base stations.

3. The method of claim 2, further performed by the entity and comprising the steps of:
   receiving a handover indication primitive from the NCMS used to request a handover procedure to start, wherein the handover indication primitive includes a target base station Identifier ("ID") and message type to represent at least one of handover start and handover cancel; and
   transmitting a mobility handover indication message to the serving base station to start the handover procedure.

4. The method of claim 1, wherein the entity and the NCMS support Media Independent Handover functions.

5. A method of executing a handover procedure performed between an entity comprising a management plane and a data plane, and a Network Control Management System ("NCMS") both in a serving base station, the method initiated by the NCMS and comprising:
   sending, from the NCMS to the entity, a handover request primitive to request the entity for transmitting a mobility handover request message to a mobile station;
   transmitting the mobility handover request message to the mobile station from the entity in response to receiving the handover request primitive;
   receiving a mobility handover indication message from the mobile station by the entity; and
   sending another primitive to the NCMS for indicating receipt of the mobility handover indication message at the entity,
   wherein the NCMS interfaces with the entity through a Control Service Access Point or a Management Service Access Point, and the Management Service Access Point is used for performing system configuration, monitoring statistics, and notifications/triggers and the Control Service Access Point is used for handovers, idle mode mobility management, subscriber and session management and radio resource management.

6. The method of claim 5, wherein the entity and the NCMS support Media Independent Handover functions.

* * * * *